Patented Feb. 9, 1943

2,310,873

UNITED STATES PATENT OFFICE 2,310,873

QUATERNARY AMMONIUM COMPOUND

John Carl Sauer, Wilmington, Del., assignor to E. I. du Pont de Nemours & Company, Wilmington, Del., a corporation of Delaware No Drawing. Application November 4, 1940, Serial No. 364,331

2 Claims. (Cl. 260—295)

This invention relates to new compositions of matter and more particularly to dicarboxylic acid diamides containing quaternary ammonium salt groups.

This invention has an object the preparation of new quaternary ammonium salts. A further object is the preparation of new waterproofing agents. Another object is the preparation of agents for affecting the "feel" or "hand" of textiles. Other objects will appear hereinafter.

These objects are accomplished by the following invention of diamides of aliphatic dicarboxylic acids having a quaternary ammonium salt (of a monovalent anion) group attached to each amido nitrogen through a methylene ($CH_2$) group, the sum of the aliphatic carbon atoms exclusive of the carboxyl carbons in the bivalent radical separating the methylene groups being at least ten, and the preparation of these compounds through the reaction of a tertiary amine, formaldehyde, a hydrohalogen acid, and a dicarboxylic diacid diamide of at least 10 aliphatic carbon atoms, each amide group being hydrogen-bearing.

Diacid amides having at least one hydrogen on each amido nitrogen may be prepared in several ways, e. g. by the reaction of an aliphatic diacid chloride with a primary amine or ammonia, by the reaction of a diester with ammonia or a primary amine, or by the amidation of aliphatic dibasic acids with a primary amine or ammonia.

These diacid amides are reacted with paraformaldehyde and an anhydrous hydrohalogen acid to produce the halomethyl derivative. In this condensation, anhydrous hydrohalogen acid is introduced into a solution of the aliphatic dicarboxylic acid diamide and paraformaldehyde in an inert solvent, e. g. benzene, with continuous stirring of the reaction mixture, the temperature being maintained at 50 to 60° C. The water formed during the reaction is separated from the benzene layer, and the benzene is removed under reduced pressure at a temperature of 50 to 60° C. The removal of the benzene also insures the removal of the excess hydrohalogen acid dissolved therein.

The resulting halomethyl derivatives are condensed with a tertiary amine in the cold, either in the presence or absence of a solvent. A temperature range of 0° to 50° C. is acceptable, but the preferred range is 15° to 30° C. When pyridine is used, an excess is added so that a homogeneous solution will result, and the excess pyridine can be removed at low temperatures under reduced pressure.

The more detailed practice of the invention is illustrated by the following examples, wherein parts given are by weight. There are of course many forms of the invention other than these specific embodiments.

Example 1

N,N'-dioctadecyladipamide is prepared by adding adipic acid (53 parts) to octadecylamine (203.3 parts) and heating the intimate mixture in a reaction vessel at 180–200° C. for three hours, an outlet being provided for the removal of water produced by the reaction. The yield of pure product melting at 121-2° C. is 72 per cent.

Analysis: Calculated for $C_{42}H_{84}O_2N_2$: N, 4.3; found: N, 4.3.

A mixture of N,N'-dioctadecyladipamide (200 parts) in dry benzene (1100 parts) and paraformaldehyde (37 parts) is stirred at 50–60° C. for 2.5 hours while a stream of dry hydrogen chloride is bubbled therethrough. After separating the water layer, benzene is removed at 40° C. under diminished pressure. The reaction product contains chlorine in the amount indicated below.

Analysis: Calculated for $C_{44}H_{86}O_2N_2Cl_2$: Cl, 9.5; found: Cl, 10.7.

The quaternary pyridinium salt is made by dissolving the chloromethyl derivative in an excess of dry pyridine followed by distillation at 40° C. under reduced pressure to remove the excess pyridine. The quaternary ammonium salt so obtained contains chlorine in the amount indicated below.

Analysis: Calculated for $C_{54}H_{96}O_2N_4Cl_2$: Cl, 7.8; found: Cl, 10.8, the excess being probably due to the presence of some pyridine hydrochloride.

Analysis of the product for "active ingredient" content is carried out by the following method. To a weighed sample of the product is added ice and methanol. The cold solution is titrated with alkali immediately. This indicates the portion of chlorine present as pyridine hydrochloride. A second weighed sample dissolved in methanol is heated at reflux temperature for 10 hours, and then titrated with alkali. The heating step converts all the quaternary ammonium salt to pyridine hydrochloride. Subsequent titration with standard alkali indicates the total chlorine content. The difference between the total halogen and the chlorine present as pyridine hydrochloride gives the "active ingredient" content. In this case it was 92 per cent.

The quaternary ammonium chloride (5 parts) is pasted with ethanol (6 parts) at 40°–43° C. Water (90 parts) at 40°–43° C. is added with stirring, and sodium acetate (2 parts) in water (4 parts) at 40°–43° C. is added to a pH of approximately five. Cotton jean cloth is dipped into the solution, squeezed through rollers, and the process repeated to obtain a wet cloth weighing approximately twice its dry weight. The wet cloth is then dried by means of circulating warm dry air and finally baked at 150° C. for five minutes. This treatment imparts to the unlaundered fabric a repellency corresponding to 100 by the spray test. The value is 90 after laundering. A cloth having a repellency of 100 by the spray test will, when inclined at a 45° angle, completely repel 250 cc. of water at 80° F. sprayed from a height of six inches directly above the center of the fabric, and none will cling to the cloth. A repellency of 90 indicates that a few drops of water cling to the cloth but do not wet it and can be completely removed by shaking. The laundering treatment consists in boiling the sample in a 0.1 per cent neutral soap solution for one hour, rinsing thoroughly and drying.

*Example II*

N,N'-Di-(dodecyl)sebacamide is prepared by adding sebacic acid (101 parts) to dodecylamine (182 parts) and heating the intimate mixture in a reaction vessel at 180°–200° C. for three hours. An outlet is provided for the water produced during the reaction. The yield of purified amide is 78 per cent.

Analysis: Calculated for $C_{34}H_{68}O_2N_2$: N, 5.2; found: N, 5.1.

N,N'-Di-(chloromethyl)-N,N'-di-(dodecyl)sebacamide is prepared by adding paraformaldehyde (13 parts) to N,N'-di-(dodecyl)-sebacamide (103 parts) in dry benzene (640 parts), stirring the mixture at 50°–60° C. for 2.5 hours while a stream of dry hydrogen chloride is bubbled therethrough and, after separating the water layer, removing the benzene at 40° C. under diminished pressure. A sample of the reaction product contains 11.7% chlorine compared with the theory of 11.2% for $C_{36}H_{70}N_2O_2Cl_2$.

The quaternary triethylammonium salt is prepared by dissolving the di-(chloromethyl) derivative in benzene (300 parts), adding an excess of triethylamine with rapid stirring, and removing both the excess amine and the benzene at 40° C. under reduced pressure. The quaternary ammonium salt so obtained contains 9.1% chlorine compared with the theory of 8.5% for $C_{48}H_{100}N_4O_2Cl_2$. Analysis for "active ingredient" content gives a value of 78 per cent.

The water repelling agent (5 parts) is pasted with ethanol (6 parts) at 40°–43° C. Water (90 parts) at 40°–43° C. is added with stirring and sodium acetate (2 parts) in water (4 parts) at 40°–43° C. is added to produce a pH of approximately 5. Cotton jean cloth is dipped into the solution, squeezed through rollers, and the process repeated in order to obtain a wet cloth weighing approximately twice its dry weight. The wet cloth is then dried in front of a hair drier or by other means for circulating warm dry air over the fabric and finally baked at 150° C. for 5 minutes. This treatment imparts to the unlaundered fabric a repellency of 85 and a repellency of 75 after laundering.

*Example III*

N,N'-tridecanedianilide is prepared by adding aniline (103 parts) in a slow stream with stirring to tridecanedioyl dichloride (281 parts) in benzene (700 parts), then sodium hydroxide (80 parts) in water (200 parts) and then aniline (103 parts) dropwise as the reaction mixture is stirred. A yield of 67 per cent of the purified dianilide is obtained. This analyses for 7.3% N compared with the theory of 7.1% for $C_{25}H_{34}O_2N_2$.

N,N'-di-(chloromethyl), N,N'-tridecanedianilide is prepared by adding paraformaldehyde (20 parts) to N,N'-tridecanedianilide (132 parts) in dry benzene (695 parts), stirring the mixture at 50° to 60° C. for 2.5 hours while a stream of dry hydrogen chloride is bubbled through the reaction mixture and, after the water layer has been separated, removing the benzene at 40° C. under diminished pressure. A sample of the reaction product contains 13.9% chlorine compared with the theory of 14.2% for $C_{27}H_{36}O_2N_2Cl_2$.

The N,N'-(methylpyridinium chloride) N,N'-tridecane-dianilide is prepared by dissolving the di-(chloromethyl) derivative in an excess of pyridine in the cold, and removing the excess pyridine under reduced pressure at 40° C. The quaternary ammonium salt so obtained contains 10.5% chlorine compared with a theory of 10.9% for $C_{37}H_{46}O_2N_4Cl_2$.

Analysis for "active ingredient" content gives a value of 62 per cent.

The water repelling agent (5 parts) is pasted with ethanol (6 parts) at 40°–43° C. Water (90 parts) at 40°–43° C. is added with stirring and sodium acetate (2 parts) in water (4 parts) at 40°–43° C. is added to produce a pH of approximately 5. Cotton jean cloth is dipped into the solution, squeezed through rollers, and the process repeated in order to obtain a wet cloth weighing approximately twice its dry weight. The wet cloth is then dried in front of a hair drier or by other means for circulating warm dry air over the fabric, and finally baked at 150° C. for 5 minutes. The treatment imparts to the unlaundered fabric a repellency of 60, and a repellency, after laundering, of 50.

The N,N'-di(quaternary ammonium) diamides of aliphatic dicarboxylic acids, in which amides the quaternary nitrogens are separated from the amido-nitrogens by a single methylene group, the sum of the aliphatic carbon atoms exclusive of the carboxyl carbons in the radicals between the methylene groups being at least 10, of this invention are formulated as follows:

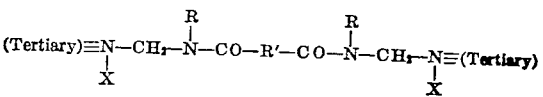

In the above general formula (Tertiary)≡N is a nitrogen atom having three valences satisfied by hydrocarbon radicals, R' is a bivalent aliphatic hydrocarbon radical, R is hydrogen or a monovalent hydrocarbon radical, alkyl, aralkyl, aryl or cycloalkyl, and X is a monovalent anion. The total number of aliphatic carbon atoms present in the R' and R groups must equal at least 10. When R is hydrogen, the acid must contain at least ten aliphatic carbon atoms exclusive of the carboxyl carbons. When R is an aryl group, as in the case of aniline or the naphthylamines, R' has the same limitations as it has when R is hydrogen. When R is an aralkyl group having n aliphatic carbon atoms, R' must have at least 10—2n aliphatic carbon atoms. In the case of benzylamine there is one aliphatic carbon atom present; therefore, the diacid amidated with it must have at least eight carbon atoms, e. g., sebacic acid or a higher homolog thereof. When R is either aliphatic or cycloaliphatic, R' must also have 10—2n aliphatic carbon atoms where n is the number of aliphatic carbon atoms present in the radical R. Oxalic acid may be used if it is di-amidated with amylamine or a primary amine containing a higher number of aliphatic carbon atoms. Malonic acid diamidated with amylamine, or with one carboxyl group amidated with butylamine and the other amidated with amylamine meet the requirements of the general statement. Adipic acid must be amidated with propylamine or some of its higher homologs in order that the combined radicals have at least 10 aliphatic carbon atoms. Acids that can be used as long as the requirements for 10 aliphatic carbon atoms are fulfilled include: oxalic, malonic, succinic, glutaric, adipic, beta-methyladipic, beta-phenyladipic, pimelic, suberic, azelaic, sebacic, hendecanedioic, dodecanedioic, tridecanedioic, tetradecanedioic, pentadecanedioic, hexadecanedioic, heptadecanedioic, octadecanedioic, nonadecanedioic, eicosanedioic, heneicosanedioic, docosanedioic, and hentriacontanedioic acids. The $C_{11}$ and $C_{12}$ dibasic acids obtained by the oxidation of "Opalwax" can be separated and the $C_{12}$ acid converted to its primary diamine by the reaction of the diester, or diacid chloride, or by direct amidation of the acid with ammonia. Tridecanedioic acid converted into its diamide by the same methods may be used satisfactorily. Some of the amines suitable for the amidation reaction are ammonia, methylamine, ethylamine, propylamine, isopropylamine, butylamine, isobutylamine, pentylamine, hexylamine, heptylamine, octylamine, nonylamine, decylamine, hendecylamine, dodecylamine, tridecylamine, tetradecylamine, pentadecylamine, hexadecylamine, heptadecylamine, octadecylamine, nonadecylamine, eicosylamine, heneicosylamine, docosylamine, tricosylamine, tetracosylamine, pentacosylamine, hexacosylamine, heptacosylamine, octacosylamine, nonacosylamine, triacontylamine, cyclohexylamine, aniline, naphthylamine, and cyclopentylamine. When the products of this invention are to be used as water repellents for textiles, it is much preferred that at least one of the radicals R or R' contain a straight chain of at least 10 aliphatic carbons.

Any diamide of an aliphatic dicarboxylic acid containing only carbon and hydrogen in addition to the carbonamido oxygen and nitrogen, having a total of at least ten aliphatic carbon atoms exclusive of the carbonamido carbons and having at least one hydrogen on each of the carbonamido nitrogens may be employed in the process of this invention for reaction with formaldehyde and anhydrous hydrohalogen acid to form the intermediate halomethyl derivative. Amides having the general formula

R—NH—CO—R'—CO—NH—R'' where R+R'+R'' contain at least 10 aliphatic carbon atoms and where R and R'' are different, fall within the scope of this invention. Such compounds may be formed, for example, by the reaction of ester chlorides, e. g. ethyl adipyl chloride [$C_2H_5OOC(CH_2)_4COCl$] with aniline to give $C_2H_5OOC(CH_2)_4CONHC_6H_5$, 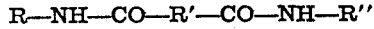 direct amidation of which with octadecylamine yields an amide having the formula $C_{18}H_{37}NHCO(CH_2)_4CONHC_6H_5$.

Conversion of the diamide having the formula R—NH—CO—R'—CO—NH—R'', where R and R'' may be alike or different, into the corresponding halomethyl derivative is effected by reaction of anhydrous formaldehyde and an anhydrous hydrohalogen acid. Any source of anhydrous formaldehyde may be employed including formaldehyde gas, paraformaldehyde, trioxymethylene and polyoxymethylene.

The halogen in the hydrohalogen acid used in the synthesis is limited to halogens having a molecular weight of at least 35 and preferably less than 126. Hydrogen chloride is preferred over hydrogen bromide for reasons of cost. The quaternary iodides are generally unstable. The other salts of monovalent anions may be prepared from the bromides and chlorides. These readily accessible halides can be reacted in aqueous solution with silver or sodium nitrate, acetate, stearate, chlorate, fluoride, perchlorate, etc. as convenient to give the corresponding ammonium salt.

The tertiary nitrogen of the tertiary amine can be contained in one cyclic radical, as in the case of pyridine; two of the bonds of the tertiary nitrogen can be occupied by a cyclic radical while the third bond is occupied by a monovalent radical, as in the case of N-methylpiperidine, or the three bonds of the tertiary nitrogen may be occupied by three monovalent radicals as in triethylamine. In any case, not more than one aromatic group may be attached to the nitrogen, for when two such groups are present an unstable quaternary salt is obtained, and when three such groups are present, quaternary salt formation does not take place. Any tertiary monoamine having not more than one aryl radical on the amino nitrogen and having all valences of the amino nitrogen satisfied by hydrocarbon radicals may be used. Suitable tertiary amines include pyridine, quinoline, N-methylpiperidine, N-ethylpiperidine, isoquinoline, nicotine, dimethylaniline, diethylaniline, dimethylbenzylamine, methylethylbenzylamine, trimethylamine, triethylamine, dimethylcyclohexylamine, dimethylpentylamine, dimethyloctadecylamine, dimethyldodecylamine, and numerous others.

The synthesis can be performed either in the presence or absence of a solvent, but reaction appears to progress more rapidly and more uniformly in the presence of an inert, anhydrous solvent. In the condensation of the N,N'-disubstituted diamide with paraformaldehyde and an anhydrous hydrohalogen acid, the solvent employed must be a nonhydroxylated, anhydrous, neutral organic liquid which is a solvent for the reactants and preferably but not necessarily a solvent for the reaction product. It is desirable for the sake of convenience that the solvents be low-boiling, e. g. boiling at 100° C. or less, although this is not absolutely necessary, for higher boiling solvents can be removed by distillation at low temperature under reduced pressure and/or by azeotropic distillation with low-boiling inert solvent. If the solvent employed during this condensation is halogenated, care must be exercised to remove all of it; otherwise the portion remaining will form a quaternary ammonium salt during the subsequent reaction with a tertiary amine for the formation of the N,N'-di-(halo-quaternary ammonium) diamides, which may lead to erroneous conclusions about the behavior of the final product. Furthermore, the excess hydrohalogen acid either dissolved in the solvent or held by occlusion by the halomethyl derivative must be removed, generally under reduced pressure; otherwise it will react with the tertiary amine to form tertiary amine hydrohalide. Suitable solvents for the condensation of the diamide, paraformaldehyde and anhydrous hydrohalogen acid are benzene, toluene, xylene, ligroin, gasoline, petroleum ether, petroleum naphtha, diethyl ether, diisopropyl ether, dioxan, decalin, tetralin, and others.

The condensation of the diamide with paraformaldehyde and the anhydrous hydrohalogen acid is ordinarily carried out at 40°–75° C. with the preferred range being 50°–60° C. The reaction, however, proceeds at room temperature or lower, but the rate is rather low. The reaction proceeds rapidly at temperatures above 75° C., but danger of side reactions such as, for example, the hydrolysis of amide groups, is introduced. The reaction proceeds rapidly enough at 50°–60° C. to make this operating temperature feasible.

In converting the halomethyl derivative to a quaternary ammonium derivative by reaction with the tertiary amine, where the latter is a comparatively low-boiling liquid and is a solvent for the quaternary ammonium compound as, for example, pyridine, an excess of the amine can be satisfactorily employed as a solvent for the product. If, however, the tertiary amine is very high-boiling, or is a solid, a solvent possessing the properties previously outlined may be used with advantage, and the calculated quantity or a slight excess of the tertiary amine added. An alternate process is to blow dry air or nitrogen through the solution of the halomethyl derivative, and when all the excess hydrohalogen acid is expelled, the tertiary amine can be added directly to this solution. Formation of the quaternary ammonium salt by reaction of the halomethyl substituted product and the tertiary amine proceeds rapidly at low temperatures, e. g., 0° to 35° C. High temperatures favor decomposition of the quaternary salt groups.

The products described in this invention are new compositions of matter and are particularly useful as durable water repellents when applied to cloth. For this purpose, textiles, particularly cellulosic textiles, are treated as described in the examples, i. e., the water repellent agent is dissolved or suspended in water and/or an organic solvent such as ethanol, the agent being present in 2–10% concentration, the textile is impregnated, then baked at 100–175° C., preferably at about 150° C. It is preferable to add to the treating mixture a buffer such as sodium acetate or sodium borate to keep the pH of the mixture between 4.5 and 6.5, preferably about 5. A permanent beneficial change in the "hand" of the cloth is effected when either an excess of the agent or an amount thereof too small to produce water repellency is applied to cloth. When an amount of the product too small to produce water repellency is applied to fabric, a permanent softening which is resistant to laundering is produced.

The above description and examples are intended to be illustrative only. Any modification of or variation therefrom which conforms to the spirit of the invention is intended to be included within the scope of the claims.

What is claimed is:

1. Hexane - bis(N - octadecylamidomethylene - pyridinium chloride).

2. In a process for the preparation of N,N'-diquaternary ammonium compounds, the step which comprises reacting anhydrous formaldehyde, anhydrous hydrogen chloride and hexane-bis(N-octadecylamide) and reacting the chloromethyl compound thus obtained with pyridine.

JOHN CARL SAUER.